Dec. 19, 1967 A. J. PRINCE 3,358,396

CYLINDRICAL TELEPHONE DIRECTORY

Filed Feb. 18, 1966

Andrew J. Prince
INVENTOR

BY J. N. Miller

ATTORNEY

United States Patent Office 3,358,396
Patented Dec. 19, 1967

3,358,396
CYLINDRICAL TELEPHONE DIRECTORY
Andrew J. Prince, Trenton, N.J.
(47 Stamford Road, Mercerville, N.J. 08619)
Filed Feb. 18, 1966, Ser. No. 528,587
10 Claims. (Cl. 40—68)

This invention relates to improvements in cylindrical telephone directories of the type which includes the cylinder, rotatably mounted in a casing, and bearing longitudinal rows of names and associated telephone numbers which may, selectively, be rotated into view through a longitudinal slot in the casing.

One of the principal objects of the present invention, is to provide a telephone directory of the general character referred to, in which the names and telephone numbers are typed, or otherwise written, on a sheet of paper surrounding the cylinder, and in which the cylinder, together with the names and telephone numbers, is wholly enclosed in a cylindrical casing, but having means for effecting the quick and convenient removal of the cylinder from the casing and rotatably remounting it therein, without the use of any special tools, for replacing the sheet of paper wrapped around the cylinder, or for affixing to the sheet on the cylinder, a strip, or strips of paper bearing new names and telephone numbers, so that a housewife, for example, having such a directory, bearing her most used names and telephone numbers, installed near the telephone in the kitchen or other room, can easily add or replace names and numbers on the cylinder.

Another object of this invention is to provide a telephone directory of the character referred to, in which the rotatable cylinder is of such length as to contain two groups of names in single longitudinal rows, and having a linear divider extending transversely between the adjacent ends of the aligned groups; the cylindrical casing having therein, a single longitudinal slot of sufficient length and width to expose both of the respective double groups of names and numbers, when rotated into registry with the slot. The linear divider visually separates the two groups of names and numbers, thereby greatly facilitating their quick reading as they are rotated into view, through the longitudinal slot. With this construction, it is possible to carry all the names and telephone numbers desired, including those only occasionally called.

A further object of the invention is to provide a close fitting bearing for the cylinder shaft in one end of the casing, which exerts sufficient friction on the shaft to hold the cylinder in registry with the longitudinal slot, in the casing, when released by the user. A still further object of this invention is to provide a support for the cylindrical casing, molded from plastic material or die-cast from metal, with which the linear divider is integrally formed, and having therein a set screw by means of which the cylindrical casing may be rotatably adjusted to fix the longitudinal slot in any desired angular relation with the eyes of the user. The last mentioned feature may be easily adapted to a wall support, or to a desk or a table support, in either a plastic molding or a die casting, and produced in large quantities at a very low cost.

In one embodiment of my invention, the only tool required in removal from and remounting the cylinder in the cylindrical casing is a small screwdriver or the like, to remove a finger knob on the selector end of the cylinder shaft to permit removal of a closure cap from that end of the casing, so that the cylinder can then be withdrawn from the casing and the necessary changes made in the names and numbers on the sheet surrounding the cylinder.

The sheet of paper may be of a special width, with a line through its central portion for alignment with the linear divider, as a guide in typing the two aligned groups of names and numbers on the sheet. The paper is of slightly greater length than the circumference of the cylinder, to provide the sheet with overlapping edges. Mucilage, or other adhesive substance, may be applied to the overlapping ends of the sheet to hold it in fixed position, when tightly wrapped around the cylinder. The sheet may be of such width that the overlapping edges will lie within spaces between the rows of names and numbers.

The closure cap on the selector end of the casing is of the telescopic type, through which the cylinder shaft projects, thereby forming a bearing for that end of the shaft, and which can be stripped from the shaft after removal of the knob from the extreme end of the shaft. The cap is provided with a longitudinal slot, extending a short distance from its open end for registry with the longitudinal slot in the casing. The cap may be made with a slot to fit over a pin in the casing to fix the first mentioned slot in registry with the slot in the casting, and of a diameter to fit over the end of the casing with sufficient tightness to hold it in place by friction. However, a bayonet type of latch may be provided for positively maintaining the slot in the cap in precise registry with the slot in the casing.

The slots in both the casing and the cap are preferably beveled inwardly to substantially a feather edge, to preclude shading of the names and telephone numbers.

Other objects and advantages of my improved cylindrical directory will be apparent, or pointed out in the following specification, in which reference is directed to the accompanying drawings, forming a part thereof, and in which.

Figure 1:
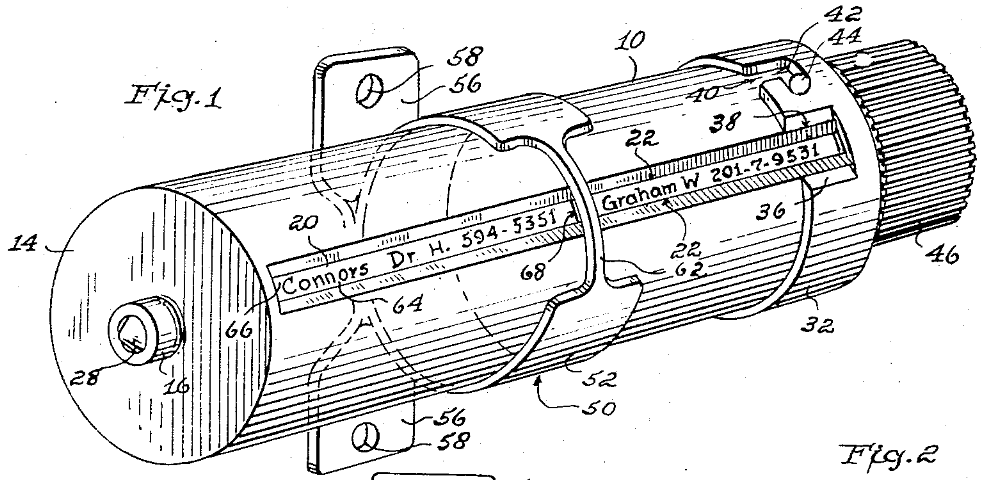
FIG. 1 is a perspective view of one form of a cylindrical telephone directory, in accordance with my invention, in which the cylindrical casing is provided with a wall support.
Figure 4:
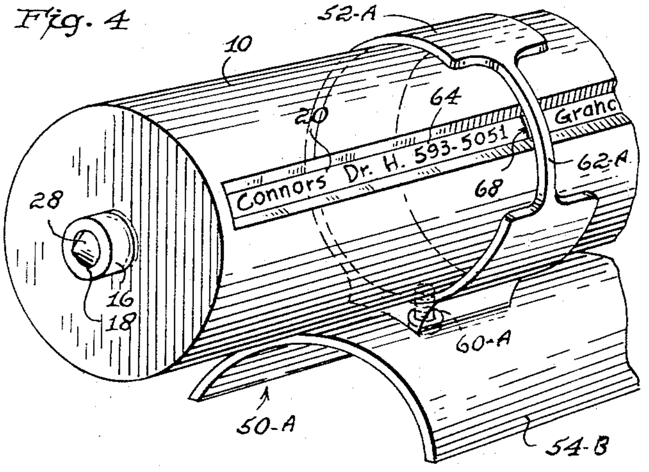
Figure 5:
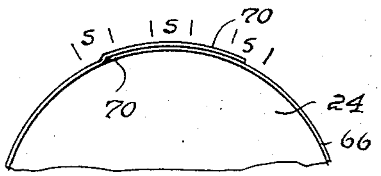

FIG. 4 is a detailed perspective view of a form of the invention, similar to that of FIG. 1, but in which the cylindrical casing is provided with a desk, or a table support; and FIG. 5 is an enlarged fragmentary end view or the rotatable cylinder, showing the manner of affixing the sheet, bearing the names and telephone numbers to the cylinder, so that the overlapping edges will lie within spaces between the rows of names and telephone numbers.

Referring to the drawings in which like numerals designate like parts or elements in the several views, and referring, first, to FIGS. 1, 2, 3 and 5, illustrating one embodiment of the present invention, the directory includes a cylindrical or tubular casing 10, having an open end 12 and a closed end 14, the latter having an outwardly projecting boss or extension 16, having therein a central shaft opening 18. This casing may be molded in plastic material, die-cast in metal or formed of other suitable material. For example, it may consist of a section of metal tubing with a closed end welded or soldered to the tubular section. It is provided with a longitudinal slot 20, extending throughout the greater portion of its length. This slot is preferably beveled to feather edges 22 to avoid a shading effect in the slot.

The rotatable cylinder 24 has two closed ends with central openings 26, through which extends a supporting shaft 28 which may be cemented or otherwise rigidly secured at one opening 26 to the closed end as indicated at 30. The shaft 28 projects through the central opening 18, which is of such a diameter as to snugly fit over the shaft 28, to provide sufficient friction to hold the shaft and cylinder against rotation, when in a desired angular position. At the other, or selector end of the casing 10, is a closure cap 32, made of plastic or other suitable material which is designed to fit telescopically and snugly over the end of the casing to provide a slight degree of frictional resistance against rotation. This cap has a closed end in which is a central opening 34, through which an extended portion of the shaft 28 rotatably projects. This cap has a longitudinal slot 36 extending a substantial distance from its open end, for rotation into registry with the slot 20 in the casing. This slot also is beveled to feather edges 38 to coincide with the edges 22 of the slot 20. The cap 32 has therein another longitudinal slot 40, merging into a bayonet slot 42, to fit over a radial pin 44 in the casing 10 to lock the cap against both rotary and longitudinal movement on the casing 10, with both the slots 20 and 36 in registry. However, with the cap fitted closely on the casing 10, the straight slot 40 would be sufficient to hold the slots 20 and 36 in registry without the bayonet slot.

A finger knob 46 is removably mounted on the projecting end of the shaft 28, by means of a small radial screw 48 to permit the withdrawal of the cap 32 and the rotatable cylinder 24, together with the shaft 28 from the casing 10.

Figure 2:
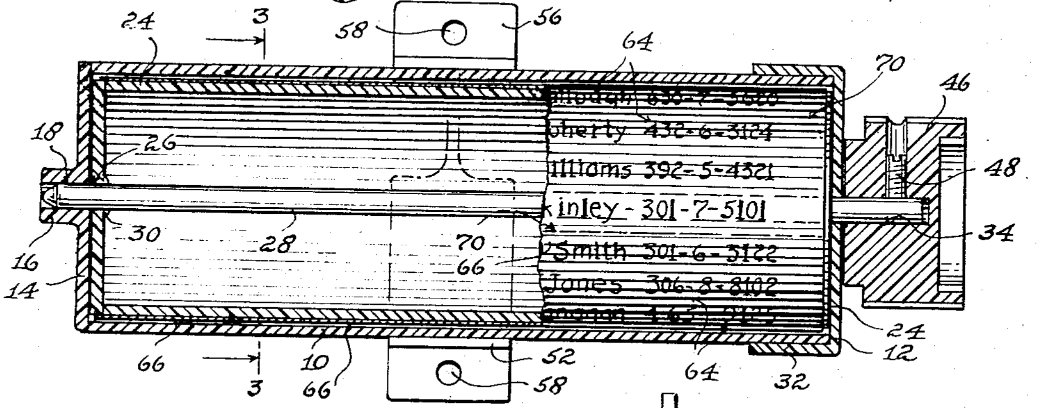
FIG. 2 is a longitudinal sectional view of the embodiment shown in FIG. 1.
Figure 3:
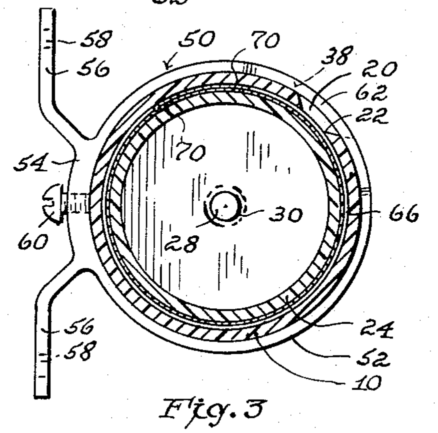
FIG. 3 is a transverse section, taken on the line 3—3 of FIG. 2.

In the form of the present invention illustrated in FIGS. 1–3, the cylindrical casing 10 is provided with a wall support, designated generally by the numeral 50, which includes a circular band 52, rotatably mounted on the casing, and having at its rear side a wall bracket 54, provided with flat, vertically extending arms 56, having openings 58 in their end portions, through which screws or the like may be inserted into a wall. The bracket may be molded or cast integrally with the band 52 or otherwise fixedly secured thereto. By means of a set screw 60 (FIG. 3) projecting through the bracket 54 the casing 10 may be rotated to bring the longitudinal slot 20 into any desired angular position in reference to the eyes of the user, and fastened to the bracket in that position. Formed with the frontal side of the band 52, which is intended to be positioned midway between the ends of the slot 20, is a narrow integral portion 62, designed to serve as a visual divider between the ends of individual groups of names and telephone numbers 64, typed or otherwise written on a sheet of paper 66, tightly wrapped around the rotatable cylinder 24.

As indicated in FIG. 1, the sheet of paper 66 may have midway thereon, a printed or drawn line 68 extending throughout its length, for alignment with the linear divider 62, to serve as a guide in the typing or writing of the respective groups of names and telephone numbers on the sheet. As indicated in FIGS. 2 and 5, the sheet of paper 66, bearing the names and numbers, is of such a length that when tightly wrapped around the rotatable cylinder 24, it will have overlapping edge portions 70, with the extreme ends of the overlapping portions preferably lying within spaces "S," between rows of names and numbers as indicated in FIG. 5. As previously mentioned, the overlapping ends may be secured together by means of mucilage or other adhesive substance.

In the form of the invention illustrated in FIG. 4, all the parts are the same as shown in FIGS. 1–3, except the support 50–A, which is designed to rest on a desk or a table, and includes a band 52–A, within which casing 10 is rotatably mounted. This band has the linear integral divider portion 62–A corresponding to the portion 62, as shown in FIG. 1, and a bottom portion 54–A, formed with, or rigidly attached to a semi-cylindrical or tubular base portion 54–B, secured to the casing 10, by means of a set screw 60–A, which permits rotary or angular adjustment of the casing 10, in the same manner as described with respect to the slot 20, as shown in FIGS. 1–3.

When it is desired to remove the rotatable cylinder 24 from the casing 10, for replacement of the sheet 66, containing the names and telephone numbers, or for affixing strips containing new names and numbers, it is necessary only to loosen the small screw 48, which holds the finger knob 46 on the shaft 28, to permit the withdrawal of the cap 32, and the cylinder 24 together with the shaft 28 from the casing 10.

With my improved telephone directory, bearing the most called names and telephone numbers, installed on a wall, desk or table in convenient access to a house-wife, for an example, she can quickly call any desired number, and quickly either replace the entire sheets of names and numbers, or add individual names whenever necessary.

Obviously, various changes or modifications in the detailed features of my telephone directory may be made within the spirit and scope of my invention. Therefore, it should be understood that the embodiments are intended to be illustrative only, and restricted only by the appended claims.

I claim:

1. In a cylindrical telephone directory, of the type including a cylindrical casing having, therein, a lonigtudinal slot, and having means for supporting it on a stationary surface, and a cylinder, rotatably mounted within said casing and having thereon, a sheet of paper, bearing annularly spaced rows of names, and associated telephone numbers to be selectively rotated into view through a longitudinal slot in said casing, by means outside of said casing; each of said rows on the sheet containing two longitudinally aligned groups of names and telephone numbers; the means for supporting the directory on a stationary surface including a band, surrounding said casing, and provided with a set screw for clamping engagement with said casing, to permit angular adjustment of said casing within said band in relation to said longitudinal slot, and also having a reduced width linear portion, extending transversely across said longitudinal slot, between the ends of the aligned groups of names and numbers, to provide means of visually separating said two groups of names and numbers, the length of said linear portion being substantially longer than the width of said longitudinal slot to permit said angular adjustment.

2. A cylindrical telephone directory, as in claim 1, in which said directory supporting means includes a rear wall bracket, rigidly carried thereby; said bracket having means for detachably mounting it on a wall, and with the set screw for clamping engagement with the casing, projecting through said bracket.

3. A cylindrical telephone directory as in claim 1, in which said casing supporting means includes a rigidly depending desk or table support, and in which, the set screw for clamping engagement with the casing projects through said support.

4. A cylindrical telephone directory as in claim 1, in which the rotatable cylinder is rigidly mounted on a shaft, journaled at one end, in a central opening in the end of the casing and, at its other end, in a central opening in a cap, telescopically mounted on the end of the casing; said cap having a slot extending from its open end for registry with the longitudinal slot in the casing, and the means for rotating the shaft and cylinder, comprising a finger knob, detachably mounted on the end of said shaft in abutting relation with the outer end of said cap.

5. A cylindrical telephone directory as in claim 1, in which the longitudinal slot in the casing is beveled to substantially feather edges, to preclude shading of the slot.

6. A cylindrical telephone directory as in claim 1, in which the sheet of paper, containing the names and telephone numbers is tightly wrapped around the rotatable cylinder; said sheet having overlapping end portions, provided with an adhesive substance for fixedly attaching them together.

7. A cylindrical telephone directory as in claim 4, and including a second longitudinal slot, extending from the open end of said cap, and a radial pin in said casing for engagement with said slot, to prevent relative rotation of the cap and casing, when the first mentioned slots are in coincidence.

8. A cylindrical telephone directory as in claim 4, in which the second mentioned longitudinal slot is of the bayonet type, to prevent both rotary and longitudinal movement of said cap on said casing.

9. A cylindrical telephone directory as in claim 4, in which the means for mounting the finger knob on the end of the rotary shaft, consists of a central opening in the knob, fitted on said shaft, and a radial set screw in said knob for engagement with said shaft.

10. A cylindrical telephone directory as in claim 6, in which the sheet of paper, bearing the names and telephone numbers, is of such length that the sheet can be tightly wrapped around the rotatable cylinder, with the extreme ends of the overlapping portions lying within spaces between rows of names and telephone numbers.

References Cited

UNITED STATES PATENTS

| | | | |
|---|---|---|---|
| 679,462 | 7/1901 | Kennedy et al. | 40—68 |
| 890,908 | 6/1908 | Hunter | 40—68 X |
| 894,042 | 7/1908 | O'Brien. | |

EUGENE R. CAPOZIO, *Primary Examiner.*

R. CARTER, *Assistant Examiner.*